United States Patent [19]

Koslow

[11] Patent Number: 4,850,380

[45] Date of Patent: Jul. 25, 1989

[54] ENTRY/EXIT DECONTAMINATION SYSTEM USING ADSORBENT POWDER

[75] Inventor: Evan E. Koslow, Westport, Conn.

[73] Assignee: Pall Corporation, Glen Cove, N.Y.

[21] Appl. No.: 736,458

[22] Filed: May 21, 1985

[51] Int. Cl.$^4$ ............................................. B08B 7/00
[52] U.S. Cl. ................................... 134/56 R; 134/93; 134/105; 134/109; 134/200; 312/1
[58] Field of Search .................. 134/58 R, 51 R, 123, 134/200, 93, 109, 105, 201; 312/1; 128/1 R; 422/292

[56] References Cited

U.S. PATENT DOCUMENTS

| | | | |
|---|---|---|---|
| 2,536,843 | 1/1951 | Dye | 134/123 X |
| 2,944,627 | 7/1960 | Skarstrom | 183/4.7 |
| 3,047,434 | 7/1962 | Bulat | 134/1 |
| 3,250,521 | 5/1966 | Sergent | 263/21 |
| 3,295,700 | 1/1967 | Ziegler | 312/1 X |
| 3,355,230 | 11/1967 | Trexler | 312/1 |
| 3,360,400 | 12/1967 | Evans et al. | 134/34 |
| 3,487,916 | 1/1970 | Moroni et al. | 206/47 |
| 3,498,025 | 3/1970 | Bednarski | 55/33 |
| 3,501,213 | 3/1970 | Trexler | 422/292 X |
| 3,513,631 | 5/1970 | Seibert et al. | 55/33 |
| 3,533,422 | 10/1970 | Alimanestiano | 134/54 |
| 3,594,983 | 7/1971 | Yearout | 55/33 |
| 3,659,400 | 5/1972 | Kester | 55/33 |
| 4,038,050 | 7/1977 | Lowther | 55/18 |
| 4,040,865 | 8/1977 | Eggers, III et al. | 134/7 |
| 4,094,652 | 6/1978 | Lowther | 55/33 |
| 4,101,297 | 7/1978 | Uda et al. | 55/43 |
| 4,144,186 | 3/1979 | Drobnik et al. | 422/159 |
| 4,235,600 | 11/1980 | Capella et al. | 8/137 |
| 4,236,936 | 12/1980 | Schuh | 134/7 |
| 4,279,263 | 7/1981 | Pulliam | 134/111 |
| 4,281,605 | 8/1981 | Uemura et al. | 110/245 |
| 4,304,224 | 12/1981 | Fortney | 312/1 X |
| 4,312,640 | 1/1982 | Verrando et al. | 55/33 |
| 4,312,641 | 1/1982 | Verrando et al. | 55/33 |
| 4,322,394 | 1/1982 | Mezey et al. | 423/244 |
| 4,343,629 | 8/1982 | Dinsmore et al. | 55/28 |
| 4,473,529 | 9/1984 | Boccon-Gibod | 312/1 X |
| 4,696,073 | 9/1987 | Urbania | 134/111 X |

OTHER PUBLICATIONS

R. L. Stallings, "Improved Air Filtration System by Adsorption/Desorption Methodology," Research Triangle Institute, Research Triangle Park, N.C. (Sep. 1984).

Primary Examiner—Harvey C. Hornsby
Assistant Examiner—Frankie L. Stinson
Attorney, Agent, or Firm—Leydig, Voit & Mayer

[57] ABSTRACT

A system for decontaminating persons or objects passing between a contaminated area and a clean area or shelter has an air lock decontamination chamber and a shower of powdered adsorbent. A blower circulates and disperses the powdered adsorbent throughout the air lock and contacts the adsorbent particles with the outer surfaces of persons or objects in the air lock. A control system ensures that the decontamination system is fool-proof. A network of ducts and valves or separators automatically transfers the adsorbent from the deccontamination chamber to a regeneration chamber for demand-responsive regeneration. In a first embodiment, a fluidized bed of powdered absorbent is used in the decontamination chamber and the adsorbent is periodically regenerated in a vacuum chamber by microwave heating. In a second embodiment, a gravity-fed shower of powdered adsorbent is used in the decontamination chamber and the adsorbent is continuously or periodically regenerated by moving the adsorbent through a regenerating kiln.

8 Claims, 3 Drawing Sheets

ENTRY/EXIT DECONTAMINATION SYSTEM USING ADSORBENT POWDER

BACKGROUND OF THE INVENTION

This invention relates to the field of decontamination of persons or objects as a result of exposure to toxic environments including such environments which might occur in some industrial settings or during nuclear, biological or chemical (NBC) warfare.

An effective practical decontamination procedure for the clothing and protective gear worn by personnel who have been exposed to an environment contaminated by industrial or NBC agents is required. Such decontamination is required not only to detoxify the clothing itself—which may be expensive—to permit its handling and reuse, but also to assure that the toxic substances are not carried beyond the decontamination area. Some techniques have been developed in the area of cleanup of radiological poisons after scientific experiments and after nuclear explosions. It is known, for example, that scrubbing, showering, and discarding contaminated clothing are useful techniques for decontaminating individuals exposed to radioactive fallout. Baulat, U.S. Pat. No. 3,047,434 discloses a decontamination solution said to be highly effective for washing or ultrasonically cleaning radioactive contamination from objects. The decontamination solution includes a detergent liquid, a soluble ion exchange agent, and adsorbent solids such as carbon black. In Moroni et al. U.S. Pat. No. 3,487,916 it is said the adsorbent, absorbent, and ion exchange materials can be useful for taking up radioactive contaminants when the material is contacted with human skin or with objects. Moroni et al. teaches to put the adsorbent, absorbent, or ion exchange material in a medium-hard to hard synthetic foam plastic and to use the foam plastic as a sponge to scrub the contaminated area or object.

SUMMARY OF THE INVENTION

The primary object of the invention is to provide a method and apparatus for rapid and effective decontamination of persons entering a shelter or clean area. In particular it is an object to provide more complete surface contamination removal and reduction of vapor threat potential.

Another object of the invention is to provide a simple and reliable system for decontaminating personnel which puts a minimal burden on the persons being decontaminated.

Still another object of the invention is to provide a decontamination system which has a very low rate of consumption of cleaning agents. Specifically, it is an object to provide a system in which contaminants are easily separated from the cleaning agent and in which the cleaning agent may be recycled.

Yet another object of the invention is to provide a method for intercepting the passage of contaminants into a shelter area using components that are relatively compact, reliable and energy efficient.

BRIEF DESCRIPTION OF THE DRAWINGS

Other objects and advantages of the invention will become apparent upon inspection of the drawings wherein.

While the invention has been described in connection with certain preferred embodiments, it will be understood that the intention is not to be limited to the particular forms of the invention which have been shown, but the intention is, on the contrary, to cover the various alternative and equivalent constructions included within the spirit and scope of the appended claims.

BEST MODES FOR CARRYING OUT THE INVENTION

Figure 1:
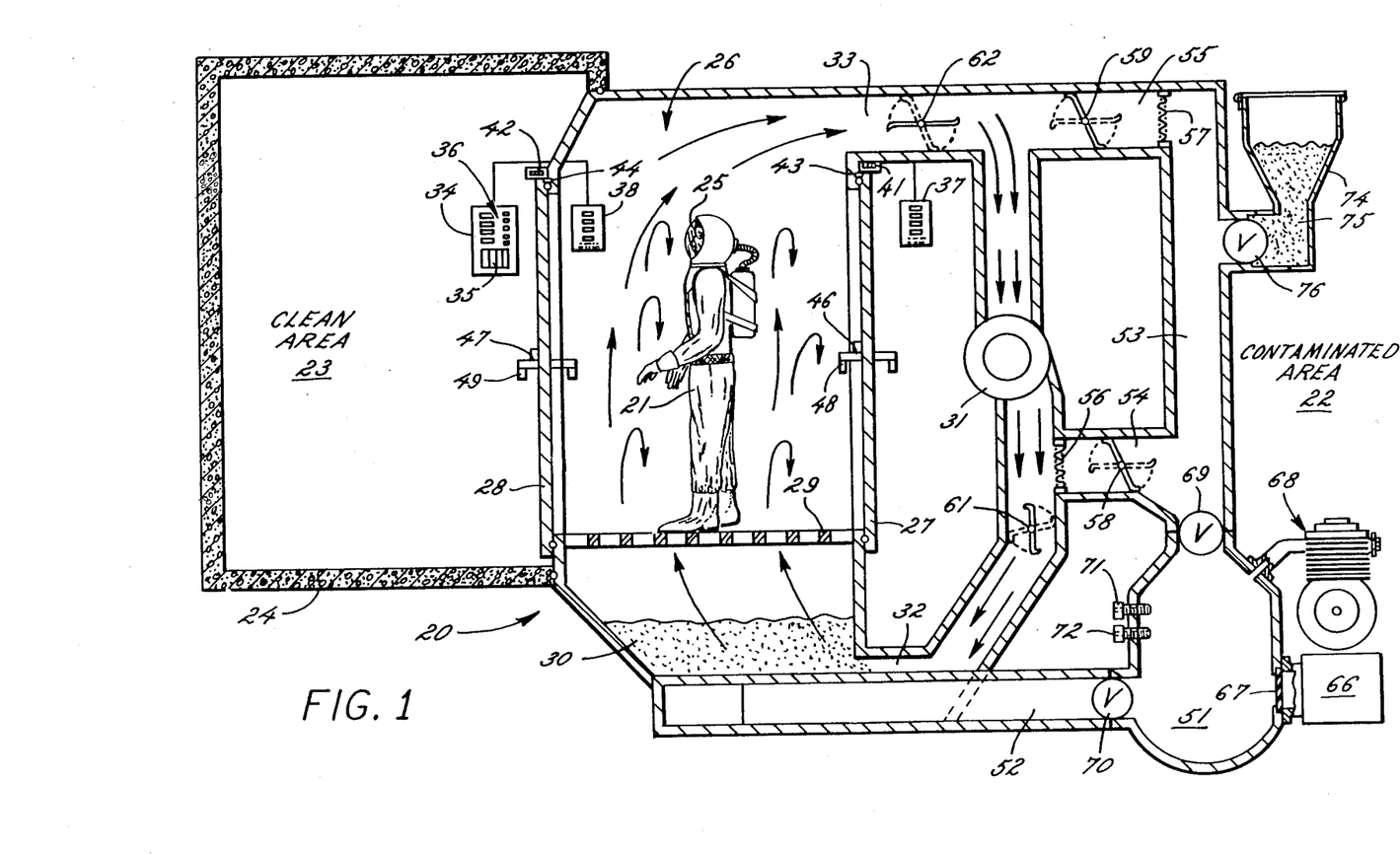
FIG. 1 is a schematic diagram of an entry/exit system according to a first embodiment of the invention.

Turning now to the drawings, there is shown in FIG. 1 a schematic diagram of an entry/exit system generally designated 20 for permitting a person 21 to pass from a contaminated area 22 into a clean area 23 without the introduction of contamination into the clean area. Such an entry/exit system is desirable, for example, for conducting military operations in a field environment contaminated by nuclear, biological, and chemical (NBC) agents. The clean area 23 is, for example, the interior of a shelter 24 which could be a bunker, tank, or other military vehicle or aircraft.

The system 20 solves two inherent problems caused by a person 21 passing from the contaminated area 22 into the clean area 23. The first problem is a passage of NBC agents in gaseous form that are dispersed or mixed with the air that would normally diffuse or be conveyed from the contaminated area 22 to the clean area 23 whenever a passage of sufficient size to accomodate a person 21 is opened between the contaminated area and the clean area. A conventional air lock system, for example, would require not only a positive pressure differential between the clean area 23 and the contaminated area 22, but it would also require considerable pumping and circulation time to displace all of the contaminated air from the air lock after the person 21 has entered the air lock from the contaminated area and before the inner door of the air lock is opened.

An even more difficult problem is the threat from surface contamination residing on the protective suit 25 worn by the person 21. The surface contamination must be removed before the person 21 may safely remove his protective suit 25.

In accordance with the broadest aspect of the present invention, the two above-mentioned problems are solved by circulating adsorbent particles throughout the air lock. The problem of replacing the contaminated air in the air lock with clean air is at least partially bypassed by bringing adsorbent particles into contact with all of the air space inside the air lock. Thus, the contaminants are removed directly and are not merely displaced or diluted by clean air. Moreover, by circulating the adsorbent particles, the adsorbent particles are also caused to come into contact with the person 21 inside the air lock thereby to directly remove surface contamination on the protective suit 25. The surface contamination is removed both by a scrubbing action to remove solid particles and by absorption or adsorption to remove contamination in the form of liquid or vapor.

In the embodiment shown in FIG. 1, an air lock is provided by a decontamination chamber generally designated 26 having an outer door 27 to the contaminated area 22 and an inner door 28 to the clean area 23. The floor of the decontamination chamber 26 is shown with a grating 29 permitting the passage of adsorbent particles or powder initially stored in a region 30 beneath the grating. The preferred adsorbent is fuller's earth. The adsorbent powder 30 is blown upwardly to create a fluidized bed of powdered adsorbent in the central portion of the chamber 26 when the chamber is occupied by the person 21 passing from the contaminated area 22 to the clean area 23. To provide the motive force for fluidizing the bed of adsorbent, a blower system is provided comprising a blower 31, an influent duct 32 directing air into the bottom portion of the chamber 26, and an effluent duct 33 exhausting air from the top of the chamber.

Although the blower 31 could be operated manually, for example by "start" and "stop" switches, a control system to operate the blower 31 is desired to insure that decontamination is sufficiently thorough and is not accidentally interrupted by persons other than the person 21 currently in the decontamination chamber 26. It is also apparent that the control system should prevent both the doors 27, 28 from being opened at any given time so that contaminated air cannot pass directly from the contaminated area 22 to the clean area 23. Moreover, the control system could be programmed with a predefined sequence of steps to be followed during the entry of the person 21 from the contaminated area 22 into the clean area 23, or during the exit of the person from the clean area 23 to the contaminated area 22.

In the entry/exit system 20 shown in FIG. 1, it is contemplated that the blower 31 is activated by a control system including a master control unit 34 located in the clean area 22. The master control 34 shown has a number of input switches 35 including a master reset switch and a display generally designated 36 shown including indicator lights to show the present state of the control system. Slave units 37 and 38 might be provided just outside the outer door 27 and inside the decontamination chamber 26 for similarly indicating the state of the control system and also to emit a siren or warning signal in the event of a malfunction. The outer and inner doors 27, 28 can be arranged to be normally locked, being unlocked in response to signals from the master control unit 34 which activate respective solenoids 41 and 42. Moreover, the master control 34 can be adapted to sense respective door switches 43, 44 indicating whether the doors 27, 28 are locked. As a safety precaution, each solenoid 41, 42 might be inhibited unless the other respective door is closed, as sensed by the door switches 43, 44. Thus, with the system as described, once the doors are initially closed, both of the doors cannot be open at any given time. The master control 34 can also be responsive to respective switches 46, 47 connected to the handles 48, 49 of the doors 27, 28 in order to receive a request by the person 21 for the unlocking of a particular one of the doors.

A microcontroller within the master control 34 can be provided to execute a program or control procedure which has a plurality of predefined steps which in turn define the state of the entry/exit system 20. An "entry" or decontamination sequence, for example, could be executed in response to an initial request by the person 21 (in the contaminated area 22) for unlocking the outer door 27, and an "exit" sequence could be executed in response to an initial request by the person 21 (in the clean area 23) for unlocking the inner door 28. During decontamination, for example, the blower 31 should be activated for a first predetermined time interval to insure sufficiently thorough decontamination. In addition, the doors 27, 28 should be kept closed during this first time interval and the outer door 27 should be kept closed during a second predetermined time interval immediately after the first time interval to insure that decontamination is not accidentally interrupted. As noted above, the states or control sequences could be indicated to the person 21 via colored indicators 36 on the master unit and by the slave display units 37, 38. The typical state of the system, for example, is the ready state indicated by green lights 36, 37, and 38. In the ready state, both of the doors 27, 28 are locked and the decontamination chamber 26 is free of contamination. When the system 20 is in the ready state, the control system 34 will immediately respond to the turning of either of the door handles 48, 49 to unlock the respective door. When this occurs, the entry/exit system 20 enters a respective new state.

When the handle 48 of the outer door 27 is jarred, the master controller 34 activates red indicator lights 36, 37, 38 signalling the start of a decontamination cycle. The outer door 27 is unlocked for a short time such as five seconds. Then, when the outer door 27 is closed, the blower 31 is activated for a predetermined time interval in order to fluidize the bed of adsorbent 30. The time interval is preselected to insure that the external parts of the protective suit 25 will be totally decontaminated and also so that NBC agents in the air in the decontamination chamber 26 will be adsorbed. During this predetermined time interval, both the outer door 27 and the inner door 28 are locked. At the end of the predetermined time interval, the blower 31 is turned off, and the entry/exit system switches to a third state indicated by orange lights 37, 38, 39 wherein the inner door 28 is unlocked. For five seconds the person 21 may open the inner door 28. During this five second time interval, the outer door 27 is locked so as to prevent the entry of another person from the contaminated area 23 before the decontaminated person 21 is out of the decontamination chamber 26. Alternatively, a sensor could indicate to the master control 34 whether the person 21 has passed from the decontamination chamber 26 to the clean area 22. If the door 28 is not opened after the five second time interval, or when the inner door 28 is again closed, the system 20 returns to its ready or green state.

When the person 21 exits from the clean area 22, the system 20 progresses from the ready or green state to the orange state indicating that the inner door 28 is unlocked, and then to the decontamination or red state. Manipulation of the door handle 49 is sensed by the master control 34 which activates the solenoid 42 to unlock the inner door 28. Once the person 21 passes through the inner door 28 and is in the decontamination chamber 26, the system 20 switches to the ready or green state once the inner door 28 is closed and locked. When the person 21 manipulates the outer door handle 48, the master control 34 activates the solenoid 41 to unlock the outer door 27 and the system 20 enters the red or decontamination state. Once the person 21 exits the decontamination chamber 26, and the outer door 27 is again closed, the blower 31 is activated for the predetermined time interval in order to decontaminate the chamber 26. Thus, even though the person 21 is not in the decontamination chamber 26, any time that the outer door 27 is jarred, the decontamination chamber 26 is cleaned so that the system 20 will enter its green or ready state characterized by the highest level of safety.

The master control 34 and the sensors 43, 44, 46, 47, and door locks 41, 42 insure that the entry/exit system imposes a minimal burden on the person 21 being decontaminated. All that the person 21 need do to become clean is to walk through the decontamination chamber 26, and refrain from taking off his protective suit 25 until he has passed into the clean area 23. In the case of exiting, the person 21 must remember not to walk into the decontamination chamber 26 without wearing his protective suit 25.

In accordance with another feature of the present invention, the powdered adsorbent 30 is periodically regenerated and recycled. Automatic means are provided for conveying at least a substantial portion of the adsorbent 30 to a regeneration chamber 51, for removing contamination from the adsorbent in the regeneration chamber 51, and for automatically returning the adsorbent in the regeneration chamber 51 to the decontamination chamber 26. The bottom portion of the decontamination chamber 51 communicates with the bottom portion of the regeneration chamber 26 through a duct 52, which is relatively short. It should be noted that the length of the duct 52 in FIG. 1 is shown longer than it need be for the sake of presenting a complete schematic diagram in FIG. 1. The upper portion of the regeneration chamber 51 is at the base of a separator column 53. The base of the separator column 53 communicates with the outlet side of the blower 31 through a duct 54, and the top of the separator column 53 communicates with a duct 55 leading to the inlet side of the blower 31. A separator screen 56 is provided at the inlet end of the duct 54, and a separator screen 57 is provided at the inlet end of the duct 55. Respective damper valves 58, 59 are included to close off the ducts 54, 55 when the blower 31 is activated to fluidize the bed of adsorbent 30.

In order to transfer the adsorbent 30 between the decontamination chamber 26 and the regeneration chamber 51, the flow of air through the blower 31 is diverted by a damper valve 61 in the influent duct 32 to the decontamination chamber 26, or by a damper valve 62 in the effluent duct 33 from the decontamination chamber 26. To transfer the adsorbent 30 from the decontamination chamber 26 to the regeneration chamber 51, the effluent duct damper 62 is closed as well as the damper 58. Dampers 61 and 59 are opened so that the adsorbent 30 is blown from the decontamination chamber 26, through the transfer duct 52, into the regeneration chamber 51, and up the separator column 53. In addition to the gravitational potential across the height of the separator column 53, the separator screen 57 also helps to contain the adsorbent within the column 53 and the regeneration chamber 51. Thus, when the blower 31 is turned off, a substantial portion of the powdered or granulated adsorbent will settle down into the regeneration chamber 51.

In order to return the adsorbent to the decontamination chamber 26, the dampers 59 and 61 are closed and the dampers 62 and 58 are opened. Thus, the air from the outlet side of the blower 31 passes through the duct 54 and blows the adsorbent from the regeneration chamber 51 through the transfer duct 52 back into the decontamination chamber 26. The air is blown upward through the decontamination chamber 26 and through the effluent duct 33 to the blower 31. Circulation of the adsorbent back into the regeneration chamber 51 is prevented by the separator screen 56.

In accordance with another important aspect of the present invention, the components for regenerating the adsorbent are relatively compact, reliable and energy-efficient. The adsorbent is regenerated by the simultaneous application of microwave energy for heating and evacuation of the regeneration chamber 51 for removal of vaporized contaminants. A magnetron 66 generates microwave energy which is fed through a dielectric plate 67 into the regeneration chamber 51. A vacuum pump 68 collects contaminant vapors released from the adsorbent upon microwave heating and exhausts the vapors to the contaminated area 23. So that a relatively high vacuum will build up in the regeneration chamber 51, valves 69 and 70 close off the upper and lower ports of the regeneration chamber 51. A vacuum sensor 71 senses that a proper vacuum has built up in the regeneration chamber 51. The failure of the valves 69, 70 could result in microwave energy leaking out of the regeneration chamber 51. To prevent any harm to the occupant 21, who could possibly be caught in the decontamination chamber 26 during regeneration, the magnetron 66 is activated only if the vacuum sensor 71 indicates a relatively high vacuum. Moreover, to sense any failure of the magnetron 66, a microwave sensor 72, such as a thermistor, is also provided in the regeneration chamber 51.

In order to make up for any loss of adsorbent, a bin 74 is provided for storing additional adsorbent 75. A valve 76 normally isolates the bin 74 from the rest of the system 20, and the valve may be opened to add more adsorbent 75 to the system.

Figure 2:
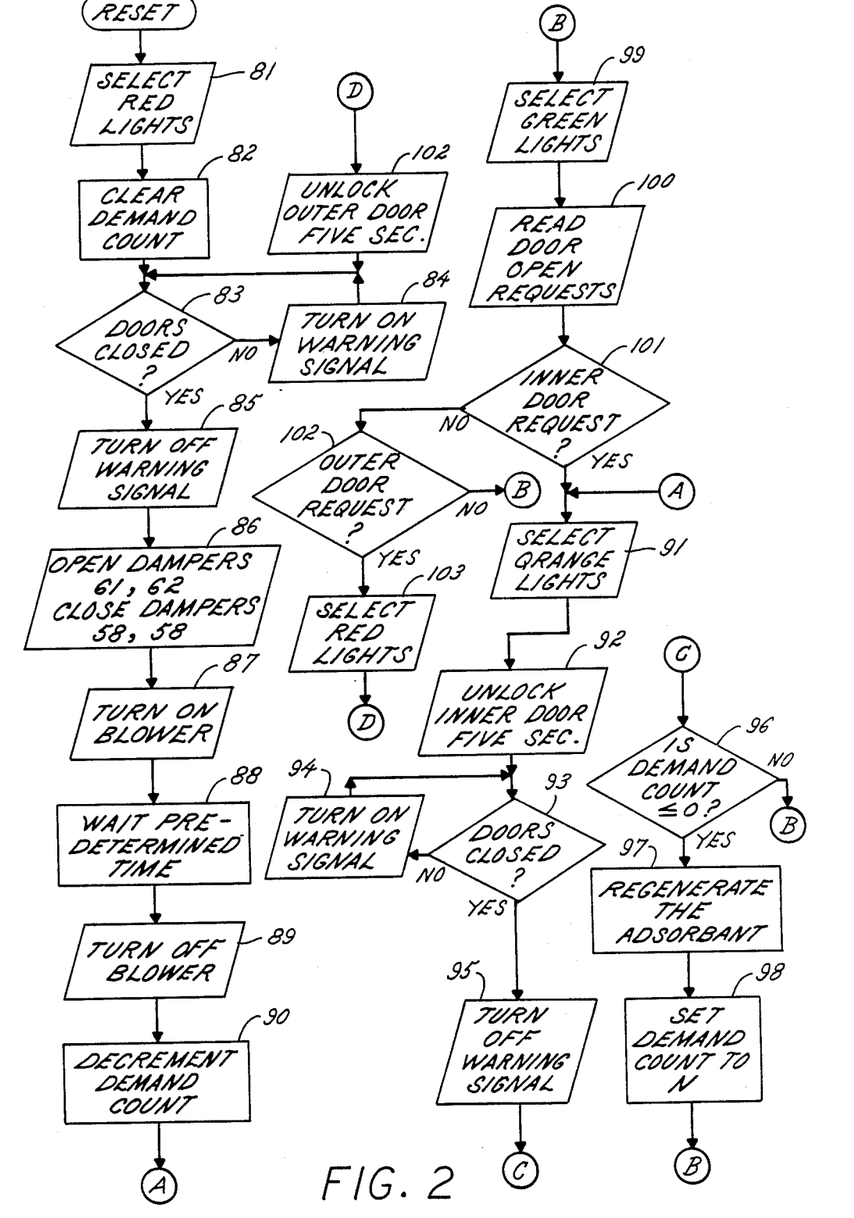
FIG. 2 is a flowchart of a control procedure for the entry/exit system shown in FIG. 1.

It is contemplated that the master control 34 is programmed to automatically operate the entire system 20 shown in FIG. 1. A specific control procedure is shown in FIG. 2. After the system 20 has been charged with adsorbent or after the system has been otherwise shut down for maintenance, the master control 34 is reset to bring the system up to the ready or green state. Upon activation of a reset key on the control keyboard 35, the control procedure of FIG. 2 starts with step 81. In order that the regeneration process is performed at a frequency responsive to the frequency of decontamination cycles, a demand counter is decremented for each decontamination cycle and regeneration occurs after a predetermined number of demand cycles. When the system is reset, for safety purposes, it is presumed that the decontamination chamber 26 is especially dirty. Hence, in the first step 81 the red lights 36, 37, 38 are selected to indicate the start of the decontamination cycle. In step 82 the demand counter is cleared to cause regeneration at the end of the decontamination cycle. In step 83 the doors 27, 28 are checked to insure that they are locked, and if they are not closed a warning signal is emitted in step 84. The system halts until the doors are closed. Then, in step 85, the warning signal is turned off. To set up the decontamination air flow shown in FIG. 1, the dampers are set to the positions indicated in FIG. 1. This is done in step 86 by opening dampers 61 and 62 and closing dampers 58 and 59. In step 87, the blower 31 is turned on and in step 88 decontamination continues for a predetermined time interval. After the time interval, in step 89 the blower is turned off. To register the occurrence of the decontamination cycle, the demand count is decremented in step 90.

After the decontamination cycle, the system enters the inner door opening or orange state. In step 91 the orange display lights 36, 37, and 38 are selected, and in step 92 the inner door 28 is unlocked for five seconds. In step 93, the master control 34 checks whether the doors 27, 28 are closed and emits a warning signal in step 94 if the doors are not closed. The warning signal is not turned off in step 95 until the doors are closed. Then in step 96, the demand count is compared to zero in order to check whether it is time for regeneration. If the demand count is less than or equal to zero, in step 97 the adsorbent is regenerated in the fashion described above. To register that the adsorbent has been regenerated, in step 98 the demand counter is set to a predetermined integer N specifying the number of decontamination cycles permitted for each regeneration cycle.

After regeneration or when the demand count is found in step 96 to be greater than zero, the system 20 is in its ready or green state. In step 99, the green lights 36, 37, 38 are selected and the decontamination chamber 26 is accessible through either the outer door 27 or the inner door 28. The door handle switches 46 and 47 are sensed in step 100 to register any door opening requests. In step 101 the inner door 28 is given priority since passage through the inner door does not require an immediate decontamination cycle, but passage through the outer door 27 does require an immediate decontamination cycle.

If an inner door request was registered in step 100, the inner door opening or orange state is reached and the sequence starting with step 91 is executed as previously described. Otherwise, in step 102, an outer door request is sensed. If an outer door request was not registered in step 100, then execution jumps back to step 99 to look for outer and inner door requests. If, however, an outer door request was registered, then the red lights are selected in step 103 and the outer door 27 is unlocked in step 102 to start the decontamination cycle, beginning with step 83, as previously described.

Figure 3:
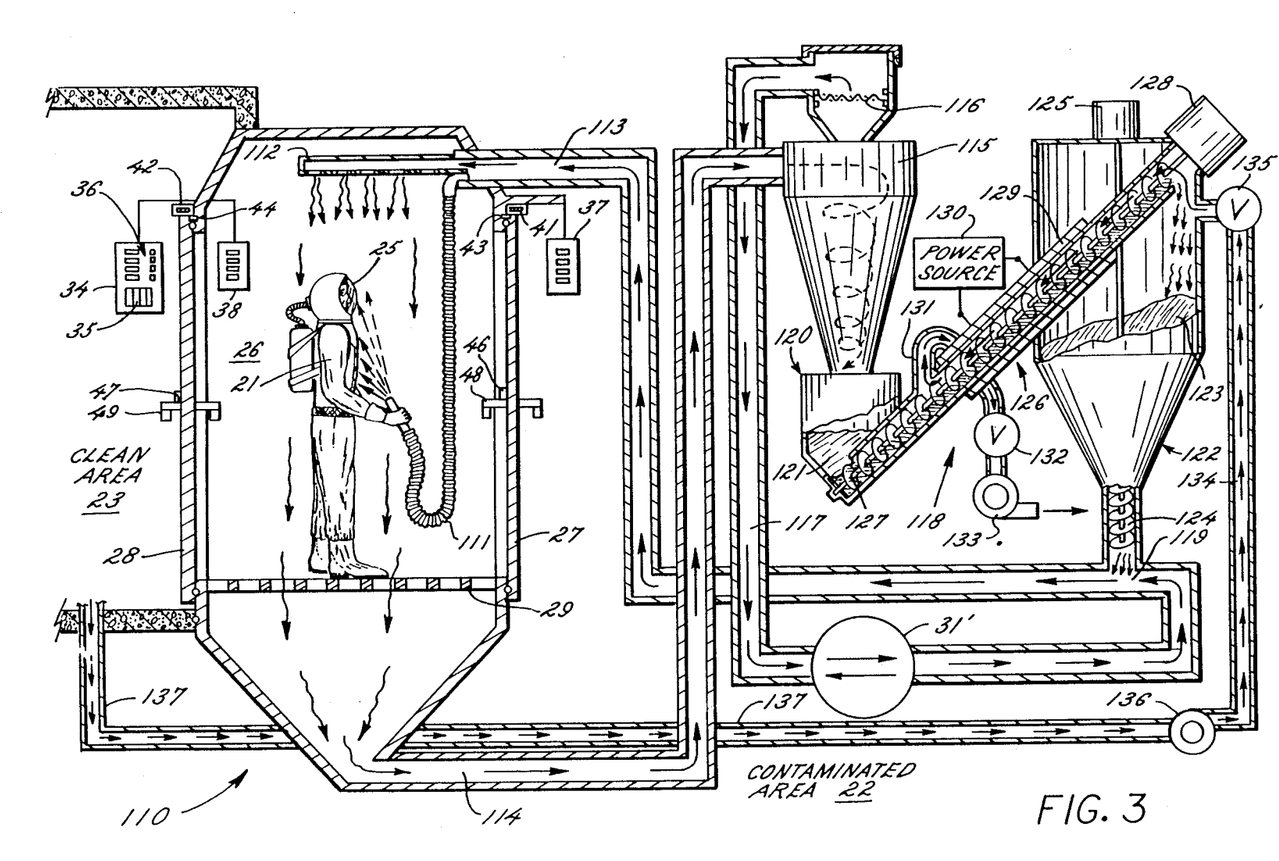
FIG. 3 is a schematic diagram of an entry/exit system according to a second embodiment of the invention.

Turning now to FIG. 3 there is shown a second embodiment of the invention generally designated 110. It can be seen that this second embodiment 110 is similar to the first embodiment 20 in FIG. 1, and the components that are used in both the first embodiment and the second embodiment are indicated by like reference numerals. In the second embodiment 110, a gravity-fed or downward flowing adsorbent shower is used rather than a fluidized bed. A downward flowing or gravity-fed shower requires less circulating air to drive the shower, but a gravity fed shower might not reach restricted areas on the protective clothing 25 of the occupant 21. To allow the occupant 21 to direct adsorbent to less accessible areas, a flexible tube 111 is provided for manipulation by the occupant 21. The tube 111 as well as an adsorbent shower head 112 is fed from an overhead influent duct 113.

The second embodiment 110 also provides for continuous regeneration of the adsorbent. To provide for continuous regeneration, the powdered adsorbent is collected at the bottom of the decontamination chamber 26 and is removed via a lower effluent duct 114. The adsorbent collected at the effluent duct 114 is regenerated before it is returned to the overhead influent duct 113. The second embodiment 110 uses a reversible blower 31 such as a turbine to continuously recirculate the air which is used to propel the powdered adsorbent through the shower head 112 and the tube 111. A centrifugal dust collector or separator 115 and a backflushable final filter 116 removes the used adsorbent from the air stream and the air stream is conveyed via a duct 117 to the blower 31'. The filter 116 is periodically backflushed by reversing the blower 31. A continuous regeneration system generally designated 118 regenerates the used adsorbent separated by the centrifugal dust collector 115, and the regenerated adsorbent is picked up by the exhaust of the blower 31' in a mixing duct 119 and transported by the air stream to the overhead influent duct 113.

To permit regeneration to be done on an intermittent basis for low demand conditions, and to provide a reserve storage of adsorbent, the regeneration system 118 includes a bin 120 for storing used adsorbent 121 and a bin 122 for storing regenerated adsorbent 123. The regenerated adsorbent bin 122 has a greater capacity than the used adsorbent bin 120 so that the make-up supply of adsorbent is stored as regenerated adsorbent 123. The regenerated adsorbent 123 is fed at a limited and controlled rate to the mixing duct 119 via a screw 124 driven by a motor 125. The speed of the motor 125 is adjusted to obtain a desired flow of adsorbent through the flexible tube 111 and the shower head 112 in the decontamination chamber 126.

To regenerate the used adsorbent 121, the used adsorbent is conveyed through a rotary kiln 126 having a low flow of air flowing in a direction opposite to the movement of the regenerated powdered adsorbent. The kiln 126 includes, for example, a heating jacket 129 including an electrical heating element energized by a power source 130. Alternatively, the jacket 129 receives heated fluid. In this case the power source 130 is, for example, an internal combustion engine and the heated fluid is exhaust gas from the internal combustion engine. The internal combustion engine could be used primarily as a power source for the shelter 23 or could be a prime mover for a vehicle incorporating the entry/exit system 110.

The countercurrent of air in the rotary kiln 126 picks up contamination desorbed or vaporized from the adsorbent. The air is exhausted via a port 131 through an exhaust valve 132 opening to the contaminated area 22. A small exhaust blower 133 is shown to prevent backflow. The source of the countercurrent of air through the rotary kiln 126 is an airline 134 supplied by air from a blower 136 fed with clean air from the clean air area 23 via an airline 137.

In view of the above, a method and apparatus for rapid and effective decontamination of persons entering a shelter or clean area have been described. More complete and total surface contamination removal and reduction of vapor threat potential is achieved by circulating adsorbent particles throughout the decontamination chamber 26 and by contacting adsorbent with the protective suit of the person being decontaminated. The decontamination process puts a minimal burden on the person being decontaminated and a control system insures that the decontamination process is foolproof. A very low rate of consumption of cleaning agent is achieved since an adsorbent is used and the adsorbent is regenerated. A first embodiment has been described using a fluidized bed of powdered adsorbent for overwhelming severe vapor and liquid contamination. A second embodiment has also been disclosed using a gravity-fed adsorbent shower and a smaller supply of adsorbent. A particularly compact, reliable and energy-efficient regeneration system has been described employing both microwave heating and vacuum purging. Also, a continuous regeneration system has been disclosed that can be powered by waste heat from an internal combustion engine.

What is claimed is:

1. A system for decontaminating outer garments of at least one person passing between a contaminated area and a clean area comprising, in combination, a decontamination chamber of sufficient size to enclose said person, said chamber having a first door for permitting said person to pass from the contaminated area into the chamber and a second door for permitting said person to pass from the chamber into the clean area, both of said doors capable of being closed to seal the chamber off from the contaminated area and the clean area when said person is inside the chamber, means for causing particles of adsorbent to come into contact with the outer garments of said person inside the decontamination chamber when the doors of the chamber are closed, to thereby remove surface contamination from the outer garments of said person inside the chamber and eliminate vapor contamination inside the chamber so that said person may pass between the contamination area and the clean area while preventing contaminants from entering the clean area, and a control system including
  (a) means for preventing both of said doors from being opened at any given time,
  (b) means for preventing the second door from being opened for a predetermined first time interval beginning whenever the first door becomes closed, and
  (c) means for activating, during said first time interval, said means for causing particles of adsorbent to come into contact with the outer garments of said person inside the decontamination chamber.

2. The system as claimed in claim 1, wherein the control system further comprises
  (d) means for preventing the first door from being opened during said first time interval and also during a second predetermined time interval immediately after said first time interval, and for permitting the second door to be opened during said second time interval.

3. A system for decontaminating outer garments of at least one person passing between a contaminated area and a clean area comprising, in combination, a decontamination chamber of sufficient size to enclose said person, said chamber having a first door for permitting said person to pass from the contaminated area into the chamber and a second door for permitting said person to pass from the chamber into the clean area, both of said doors capable of being closed to seal the chamber off from the contaminated area and the clean area when said person is inside the chamber, means for causing particles of adsorbent to come into contact with the outer garments of said person inside the decontamination chamber when the doors of the chamber are closed, to thereby remove surface contamination from the outer garments of said person inside the chamber and eliminate vapor contamination inside the chamber so that said person may pass between the contaminated area and the clean area while preventing contaminants from entering the clean area, and means for regenerating the adsorbent including
  (a) a regeneration chamber,
  (b) automatic means for conveying at least a substantial portion of the adsorbent from said means for causing said adsorbent to come into contact with the outer garments of said person to the regeneration chamber,
  (c) means for removing contamination from the adsorbent in the regeneration chamber comprising means for sealing the regeneration chamber, a vacuum pump for removing gas from the regeneration chamber and exhausting the gas to the contaminated area, and means for generating microwave energy to thereby heat the adsorbent in the regeneration chamber so that contamination vapor is released from the adsorbent and pumped to the contaminated area by the vacuum pump, and
  (d) automatic means for returning at least a substantial portion of the adsorbent in the regeneration chamber to said means for causing said adsorbent to come into contact with the outer garments of said person.

4. A system for decontaminating outer garments of at least one person passing between a contaminated area and a clean area comprising, in combination, a decontaminated chamber of sufficient size to enclose said person, said chamber having a first door for permitting said person to pass from the decontaminated area into the chamber and a second door for permitting said person to pass from the chamber into the clean area, both of said doors capable of being closed to seal the chamber off from the contaminated area and the clean area when said person is inside the chamber, means for causing particles of adsorbent to come into contact with the outer garments of said person inside the decontamination chamber when the doors of the chamber are closed, to thereby remove surface contamination from the outer garments of said person inside the chamber and eliminate vapor contamination inside the chamber so that said person may pass between the contaminated area and the clean area while preventing contaminants from entering the clean area, and means for regenerating the adsorbent including
  (a) a regeneration chamber comprising a kiln,
  (b) automatic means for conveying at least a substantial portion of the absorbent from said means for causing said adsorbent to come into contact with the outer garments of said person to the regeneration chamber,
  (c) means for removing contamination from the adsorbent in the regeneration chamber including means for moving the adsorbent in a first direction through the kiln and means for directing a flow of purge gas through the kiln in a second direction opposite to said first direction, and
  (d) automatic means for returning at least a substantial portion of the adsorbent in the regeneration chamber to said means for causing said adsorbent to come into contact with the outer garments of said person.

5. A system for decontaminating protective garments worn by a person comprising, in combination, a decontamination chamber of sufficient size to enclose said person, means for generating in the decontamination chamber a fluidized bed of particles of adsorbent in contact with the protective garments of said person, to thereby remove surface contamination from the protective garments while the person is inside the chamber, and means for regenerating the adsorbent including
  (a) a regeneration chamber, (b) automatic means for conveying at least a substantial portion of the adsorbent from the decontamination chamber to the regeneration chamber, (c) means for removing the contamination from the adsorbent in the regeneration chamber comprising means for sealing the regeneration chamber, a vacuum pump for removing gas from the regeneration chamber, and means for generating microwave energy to thereby heat the adsorbent in the regeneration chamber so that contamination vapor is released from the adsorbent and pumped out of the regeneration chamber, and (d) automatic means for returning at least a substantial portion of the adsorbent in the regeneration chamber to the decontamination chamber.

6. A system for decontaminating protective garments worn by a person comprising, in combination, a decontamination chamber of sufficient size to enclose said person, means for generating in the decontamination chamber a shower of adsorbent particles contacting the protective garments of said person, to thereby remove surface contamination from the protective garments while the person is inside the chamber, and means for regenerating the adsorbent including
(a) a regeneration chamber comprising a kiln,
(b) automatic means for conveying at least a substantial portion of the adsorbent from the decontamination chamber to the regeneration chamber,
(c) means for removing contamination from the adsorbent in the regeneration chamber including means for moving the adsorbent in a first direction through the kiln and means for directing a flow of purge gas through the kiln in a second direction opposite to said first direction, and
(d) automatic means for returning at least a substantial portion of the adsorbent in the regeneration chamber to the decontamination chamber.

7. A system for decontaminating protective garments worn by a person comprising, in combination, a decontamination chamber of sufficient size to enclose said person, means for generating in the decontamination chamber a shower of adsorbent particles contacting the protective garments of said person, to thereby remove surface contamination from the protective garments while the person is inside the chamber, and means for regenerating the adsorbent including
(a) a regeneration chamber,
(b) automatic means for conveying at least a substantial portion of the adsorbent from the decontamination chamber to the regeneration chamber comprising an effluent duct and a centrifugal dust collector,
(c) means for removing the contamination from the adsorbent in the regeneration chamber, and
(d) automatic means for returning at least a substantial portion of the adsorbent in the regeneration chamber to the decontamination chamber comprising an influent duct, the adsorbent being driven through the influent and effluent ducts by air circulated by a blower.

8. A system for decontaminating objects passing between a contaminated area and a clean area comprising, in combination, a decontamination chamber through which the objects pass between the contaminated area and the clean area, means for causing particles of powered adsorbent to come into contact with the objects when the objects are in the decontamination chamber, a regeneration chamber for receiving adsorbent having adsorbed contamination, automatic means for transferring the adsorbent between the decontamination chamber and the regeneration chamber, and said means for removing the contamination from the absorbent in the regeneration chamber comprising means for sealing the regeneration chamber, a pump for removing gas from the regeneration chamber, and means for heating the adsorbent in the regeneration chamber.

* * * * *

UNITED STATES PATENT AND TRADEMARK OFFICE
CERTIFICATE OF CORRECTION

PATENT NO. : 4,850,380
DATED : July 25, 1989
INVENTOR(S) : Evan E. Koslow

It is certified that error appears in the above-identified patent and that said Letters Patent is hereby corrected as shown below:

Col. 9, lines 17-18, delete "contamination" and substitute --contaminated--

Col. 10, lines 22-23, delete "decontaminated" and substitute --contaminated--

Col. 12, line 39, delete "absorbent" and substitute --adsorbent--

Col. 12, line 38, delete "said"

Signed and Sealed this

Twenty-third Day of July, 1991

Attest:

HARRY F. MANBECK, JR.

*Attesting Officer*         *Commissioner of Patents and Trademarks*